US009422918B2

(12) United States Patent
Lind et al.

(10) Patent No.: US 9,422,918 B2
(45) Date of Patent: Aug. 23, 2016

(54) METHODS AND SYSTEMS FOR MANAGING POWER GENERATION AND TEMPERATURE CONTROL OF AN AERIAL VEHICLE OPERATING IN CROSSWIND-FLIGHT MODE

(71) Applicant: Google Inc., Mountain View, CA (US)

(72) Inventors: Damon Vander Lind, Alameda, CA (US); Kenneth Jensen, Berkeley, CA (US)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 14/141,882

(22) Filed: Dec. 27, 2013

(65) Prior Publication Data

US 2015/0184633 A1 Jul. 2, 2015

(51) Int. Cl.
*H02P 9/04* (2006.01)
*F03D 7/02* (2006.01)
*B64C 39/02* (2006.01)
*F03D 3/02* (2006.01)
*F03D 7/04* (2006.01)
(Continued)

(52) U.S. Cl.
CPC ............ *F03D 7/0204* (2013.01); *B64C 39/022* (2013.01); *F03D 1/02* (2013.01); *F03D 3/02* (2013.01); *F03D 7/028* (2013.01); *F03D 7/042* (2013.01); *F03D 9/002* (2013.01); *H02P 9/04* (2013.01); *F05B 2240/921* (2013.01); *Y02E 10/723* (2013.01); *Y02E 10/725* (2013.01)

(58) Field of Classification Search
CPC ........... F03D 7/028; F03D 7/042; F03D 3/02; F03D 9/002; F03D 1/02; F03D 7/0204; B64C 39/022; F05B 2240/921; H02P 9/04
See application file for complete search history.

(56) References Cited

U.S. PATENT DOCUMENTS

| | | | | |
|---|---|---|---|---|
| 3,292,710 A | * | 12/1966 | Grut | B64C 11/30 416/132 R |
| 4,251,040 A | | 2/1981 | Loyd | |
| 6,468,035 B1 | * | 10/2002 | Otake | B64C 11/305 123/436 |

(Continued)

FOREIGN PATENT DOCUMENTS

| EP | 2631468 A1 | 8/2013 |
|---|---|---|
| WO | 2010122292 A2 | 10/2010 |

OTHER PUBLICATIONS

International Search Report and Written Opinion of International Application No. PCT/US2014/069288 dated Mar. 10, 2015 (mailed Mar. 10, 2015).

*Primary Examiner* — Tulsidas C Patel
*Assistant Examiner* — S. Mikailoff
(74) *Attorney, Agent, or Firm* — McDonnell Boehnen Hulbert & Berghoff LLP

(57) ABSTRACT

Methods and systems described herein relate to power generation control for an aerial vehicle of an air wind turbine (AWT). More specifically, the methods described herein relate to balancing power generation or preventing a component of the aerial vehicle from overheating using rotor speed control. An example method may include operating an aerial vehicle in a crosswind-flight mode to generate power. The aerial vehicle may include a rotor configured to help generate the power. While the aerial vehicle is in the crosswind-flight mode the method may include comparing a power output level of the aerial vehicle to a power threshold and, based on the comparison, adjusting operation of the rotor in a manner that generates an optimal amount of power or minimizes overheating of the aerial vehicle.

15 Claims, 8 Drawing Sheets

(51) Int. Cl.
  *F03D 9/00*  (2016.01)
  *F03D 1/02*  (2006.01)

(56) References Cited

U.S. PATENT DOCUMENTS

| | | |
|---|---|---|
| 7,109,598 B2 | 9/2006 | Roberts et al. |
| 2009/0189396 A1* | 7/2009 | Terao ................ B60L 8/00 290/55 |
| 2010/0013226 A1 | 1/2010 | Blumer et al. |
| 2010/0230546 A1 | 9/2010 | Bevirt et al. |
| 2010/0270798 A1* | 10/2010 | Poulsen et al. ............. 290/44 |
| 2010/0295321 A1 | 11/2010 | Bevirt |
| 2011/0025061 A1 | 2/2011 | Roberts |
| 2011/0052392 A1* | 3/2011 | Khmel ............. B64C 11/306 416/1 |
| 2011/0080001 A1* | 4/2011 | Gundtoft et al. ............ 290/44 |
| 2011/0121570 A1 | 5/2011 | Bevirt et al. |
| 2012/0104763 A1* | 5/2012 | Lind ............................ 290/55 |
| 2013/0221154 A1* | 8/2013 | Vander Lind et al. ........ 244/54 |
| 2013/0313827 A1* | 11/2013 | Lovmand et al. ........... 290/44 |
| 2015/0076284 A1* | 3/2015 | Chubb et al. ............ 244/1 TD |
| 2015/0076289 A1* | 3/2015 | Chubb et al. ............ 244/76 R |

* cited by examiner

METHODS AND SYSTEMS FOR MANAGING POWER GENERATION AND TEMPERATURE CONTROL OF AN AERIAL VEHICLE OPERATING IN CROSSWIND-FLIGHT MODE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and systems for managing power generation of an aerial vehicle operating in a crosswind-flight mode are described herein. Beneficially, such embodiments may help produce power output in an efficient manner as the aerial vehicle operates in crosswind flight during variable wind conditions (e.g., during wind speed increases and wind speed decreases). Further, embodiments described herein may help mitigate overheating of power generation components of the aerial vehicle by maintaining or reducing power generation as needed.

In one aspect, a method may comprise operating an aerial vehicle of an air wind turbine (AWT) in a crosswind-flight mode to generate power. The aerial vehicle may be coupled to a ground station through a tether. The aerial vehicle may include at least one rotor coupled to at least one generator for the purpose of power generation when the aerial vehicle operates in the crosswind-flight mode. While the aerial vehicle is in the crosswind-flight mode, the method may include determining a power generation state of the aerial vehicle. The power generation state may be one of a plurality of power generation states of the aerial vehicle. The plurality of power generation states may include, but are not limited to, an efficiency-limited power generation state and a temperature-limited power generation state. Other power generation states are possible as well. The method may further include selecting, based on the determined power-generation state, a control scheme for one or more power-generation components of the aerial vehicle. A first control scheme may be selected if the aerial vehicle is in the efficiency-limited power generation state. A second control scheme may be selected if the aerial vehicle is in the temperature-limited power generation state. Additional or other control schemes may be selected as well, and may be based on power generation states other than an efficiency-limited power generation state and a temperature-limited power generation state. The method may further include operating the one or more power-generation components of the aerial vehicle according to the selected control scheme.

In another aspect, an airborne wind turbine (AWT) system may comprise an aerial vehicle configured to operate in a crosswind-flight mode to generate power, The aerial vehicle may be coupled to a ground station through a tether. The aerial vehicle may include at least one rotor coupled to at least one generator for the purpose of power generation when the aerial vehicle operates in the crosswind-flight mode. The system may further include a control system configured to, while the aerial vehicle is in the crosswind-flight mode; determine a power generation state of the aerial vehicle. The power generation state may be one of a plurality of power generation states of the aerial vehicle. The plurality of power generation states may include, but are not limited to, an efficiency-limited power generation state and a temperature-limited power generation state. Other power generation states are possible as well. The control system may be further configured to include selecting, based on the determined power-generation state, a control scheme for one or more power-generation components of the aerial vehicle. A first control scheme may be selected if the aerial vehicle is in the efficiency-limited power generation state. A second control scheme may be selected if the aerial vehicle is in the temperature-limited power generation state. Additional or other control schemes may be selected as well, and may be based on power generation states other than an efficiency-limited power generation state and a temperature-limited power generation state. The control system may also be further configured to operate the one or more power-generation components of the aerial vehicle according to the selected control scheme.

In another aspect, a method may comprise operating an aerial vehicle of an air wind turbine (AWT) in a crosswind-flight mode to generate power. The aerial vehicle may be coupled to a ground station through a tether. The aerial vehicle may include at least one rotor coupled to at least one generator for the purpose of power generation when the aerial vehicle operates in the crosswind-flight mode. While the aerial vehicle is in the crosswind-flight mode, the method may include determining a power generation state of the aerial vehicle. The power generation state may be one of a plurality of power generation states of the aerial vehicle. The method may further include selecting, based on the determined power-generation state, a control scheme for one or more power-generation components of the aerial vehicle and operating the one or more power-generation components of the aerial vehicle according to the selected control scheme.

These as well as other aspects, advantages, and alternatives, will become apparent to those of ordinary skill in the art by reading the following detailed description, with reference where appropriate to the accompanying drawings.

DETAILED DESCRIPTION

Figure 1:
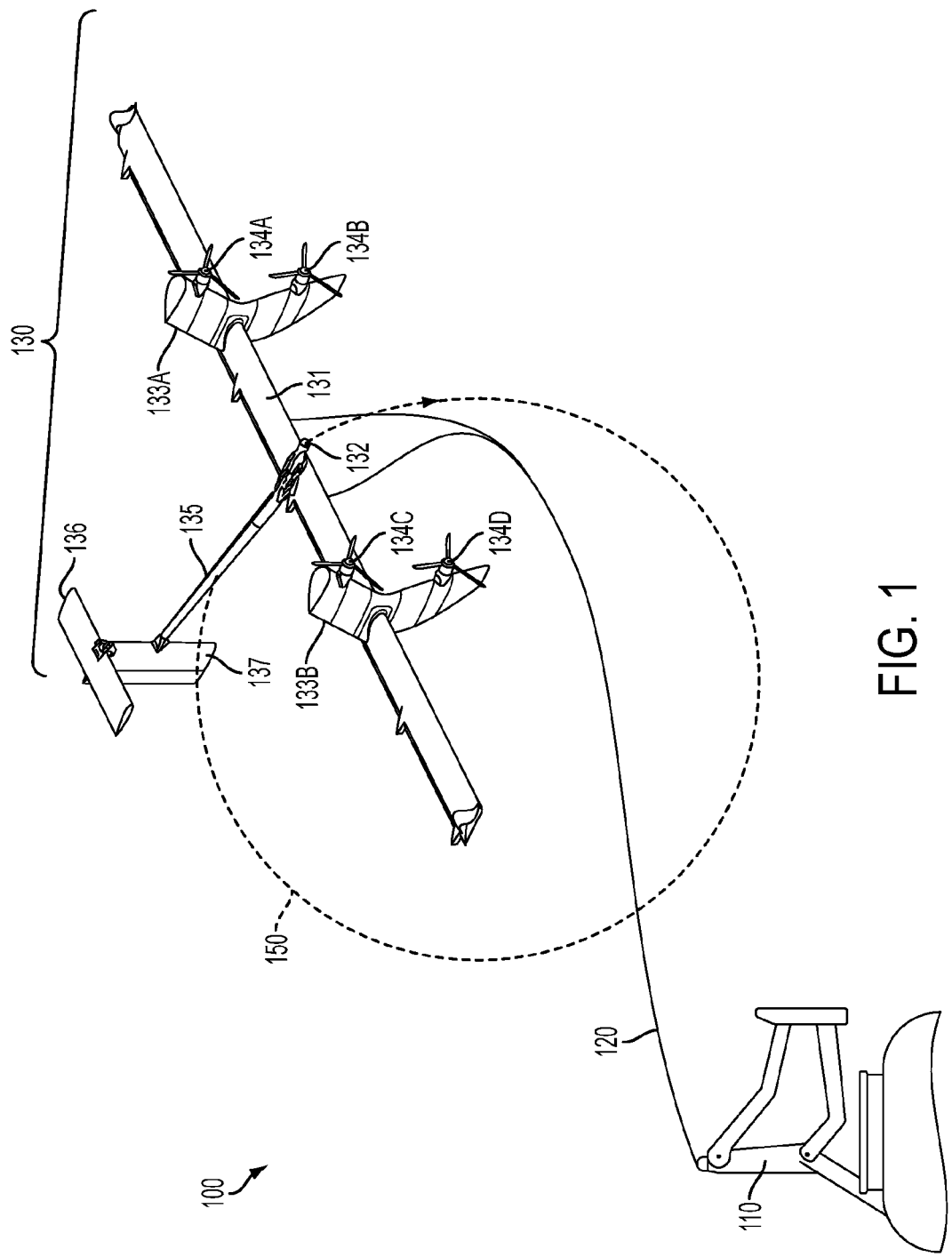
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Illustrative embodiments relate to aerial vehicles, which may be used in a wind energy system, such as an Airborne Wind Turbine (AWT). In particular, illustrative embodiments may relate to or take the form of methods and systems for transitioning an aerial vehicle between certain flight modes that facilitate conversion of kinetic energy to electrical energy.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some embodiments, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, the ground station may deploy (or launch) the aerial vehicle. For example, in one embodiment, the aerial vehicle may be deployed when the wind speed is at or greater than 3.5 meters per second (m/s) at an altitude of 200 meters (m), In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers (or rotors) of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

In some embodiments, a tension of the tether during crosswind flight may be greater than a tension of the tether during hover flight. For instance, in one embodiment, the tension of the tether during crosswind flight may be 15 kilonewtons (KN), and the tension of the tether during hover flight may be 1 KN.

In line with the discussion above, the aerial vehicle may generate electrical energy in crosswind flight and may thereby allow the AWT to extract useful power from the wind. The aerial vehicle may generate electrical energy in various wind conditions such as high wind speeds, large gusts, turbulent air, or variable wind conditions. Generally, the inertial speed of the aerial vehicle, the tension of the tether, and the power output of the AWT increase as the wind speed increases. Additionally, the power output typically has a maximum effective limit (rated power output). The wind speed at which the power output limit is reached is defined as the rated wind speed. Additionally, the power generation components of the AWT may produce heat, and as power output increases, the heat production may increase, potentially limiting the operational parameters of the AWT. Therefore, it may be desirable to enact control schemes that control the power generation components and therefore control their heat production.

Considering this, disclosed embodiments may allow for operating an aerial vehicle of an AWT in crosswind-flight in a manner that may efficiently generate power generation in variable wind conditions such as those noted above and/or may control and/or limit the heat produced by power generation components in the aerial vehicle.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
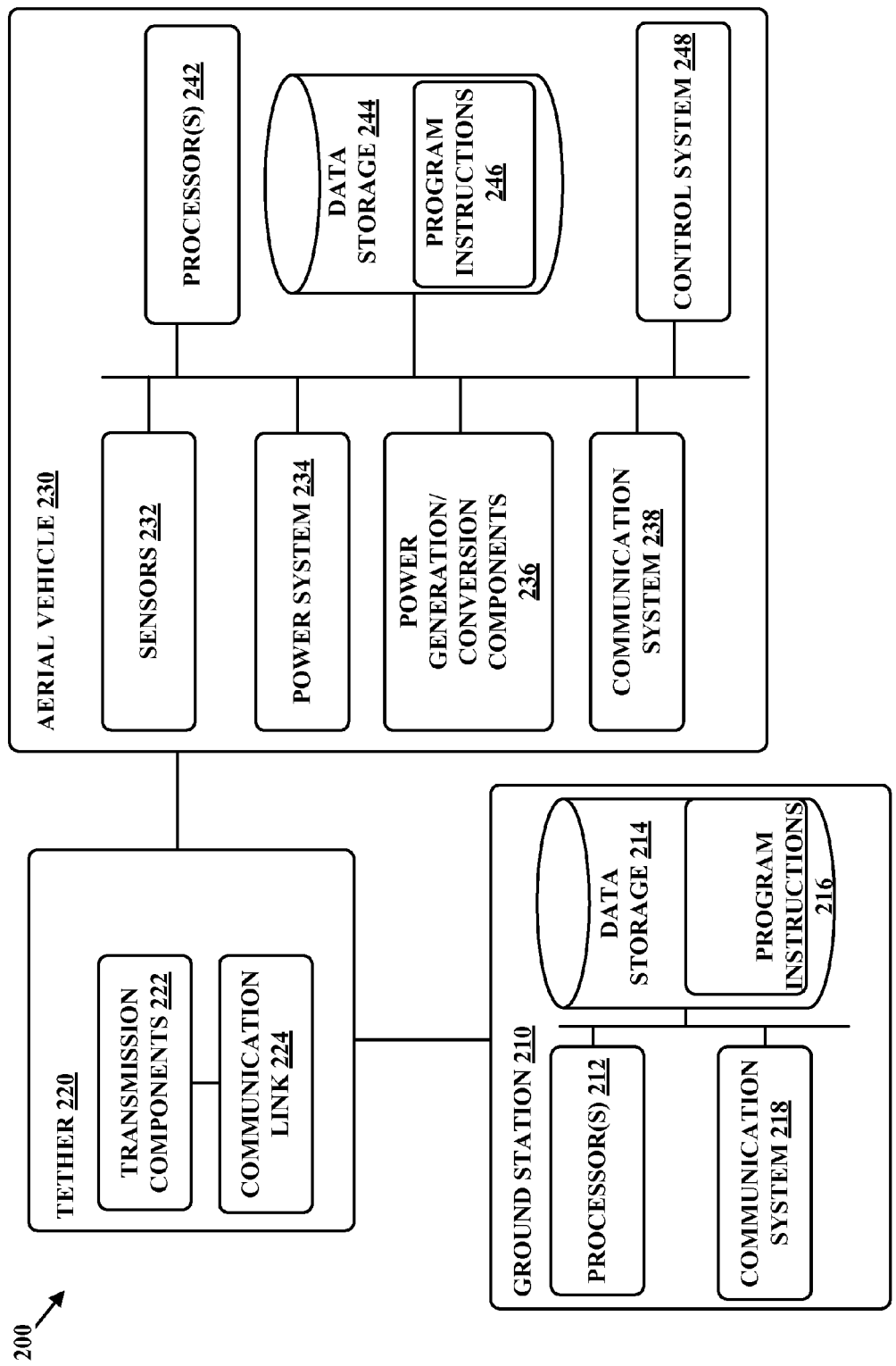
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a Nano-ElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples of sensors are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

Figure 3A:
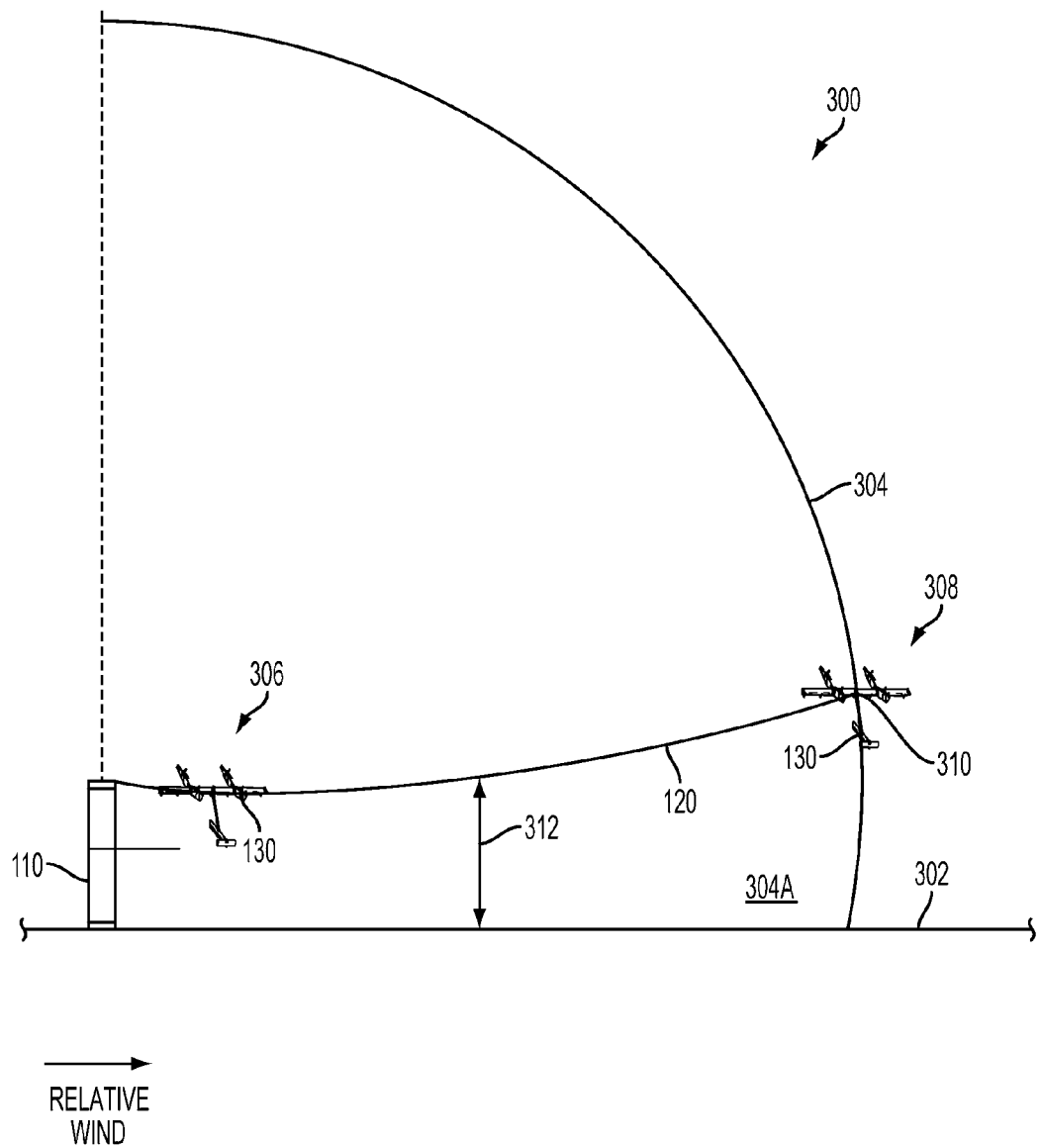
FIGS. 3A and 3B depict an example of an aerial vehicle transitioning from hover flight to crosswind flight, according to an example embodiment.
Figure 3B:
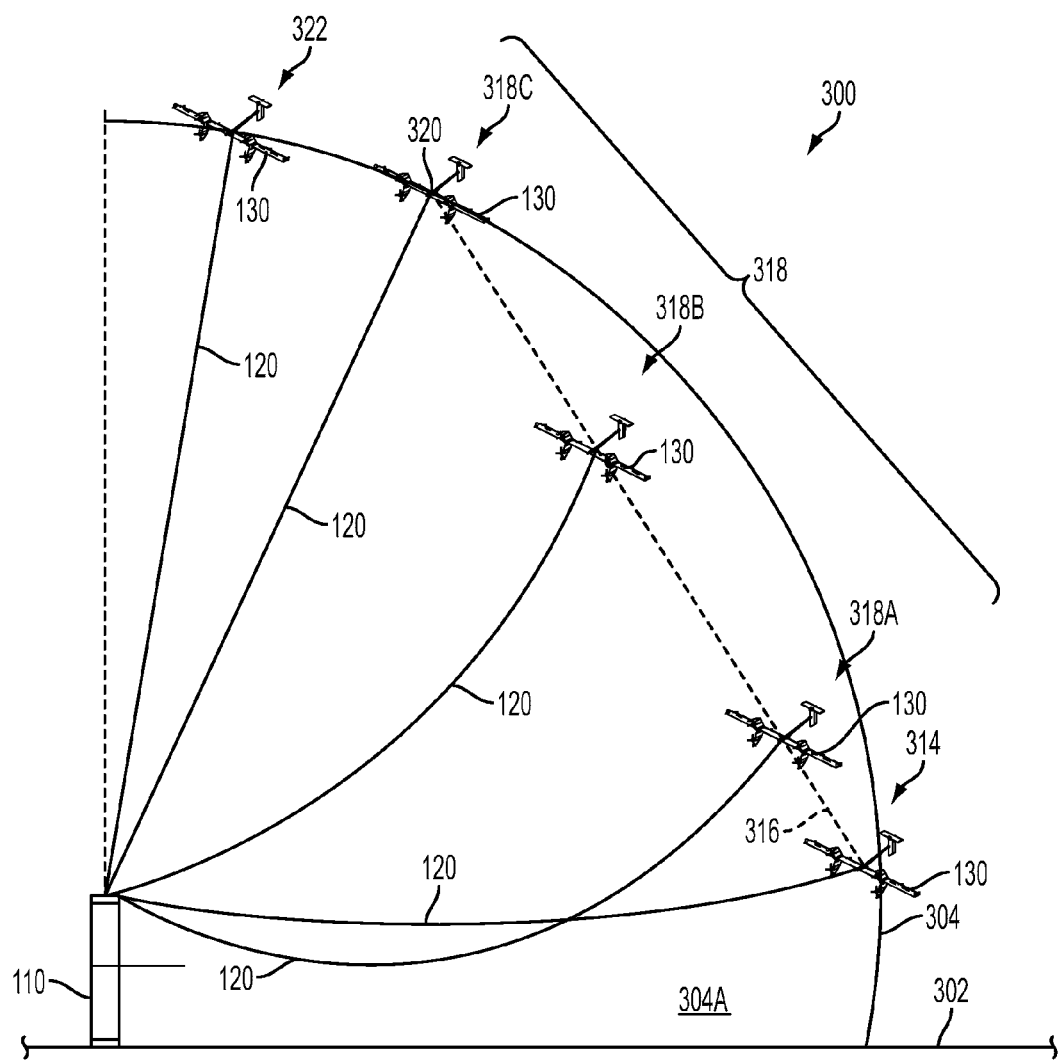

C. Transitioning an Aerial Vehicle from Hover Flight to Crosswind Flight to Generate Power FIGS. 3A and 3B depict an example 300 of transitioning an aerial vehicle from hover flight to crosswind flight in a manner such that power may be generated, according to an example embodiment. Example 300 is generally described by way of example as being carried out by the aerial vehicle 130 described above in connection with FIG. 1. For illustrative purposes, example 300 is described in a series of actions as shown in FIGS. 3A and 3B, though example 300 could be carried out in any number of actions and/or combination of actions.

As shown in FIG. 3A, the aerial vehicle 130 may be connected to the tether 120, and the tether 120 is connected to the ground station 110. The ground station 110 is located on ground 302. Moreover, as shown in FIG. 3A, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 with while the aerial vehicle 130 is in the hover-flight orientation positioning the aerial vehicle 130 at a first location 310 that is substantially on the tether sphere 304. As shown in FIG. 3A, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3A, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3B, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent to a second location 320 that is substantially on the tether sphere 304. As shown in FIG. 3B, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent may be an angle between the path 316 and the ground 302. Further, the path 316 may take various different forms in various different embodiments. For instance, the path 316 may be a line segment, such as a chord of the tether sphere 304.

As shown in FIG. 3B, the second location 320 may be in the air and substantially downwind of the ground station 110. The second location 320 may be oriented with respect to the ground station 110 the similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3B, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Example 300 continues at a point 322 with transitioning the aerial vehicle 130 from the forward-flight orientation to a crosswind-flight mode. In some examples, transitioning the aerial vehicle 130 from the forward-flight orientation to the crosswind-flight mode may involve a flight maneuver. When the aerial vehicle 130 is in the crosswind-flight mode, the aerial vehicle 130 may engage in crosswind flight. For instance, when the aerial vehicle 130 engages in crosswind flight, the aerial vehicle 130 may fly, at a multiple of attached-wind flow (not shown in FIG. 3B) substantially along a path, such as path 150, to generate electrical energy. In some implementations, a natural roll and/or yaw of the aerial vehicle 130 may occur during crosswind flight.

Figure 3C:
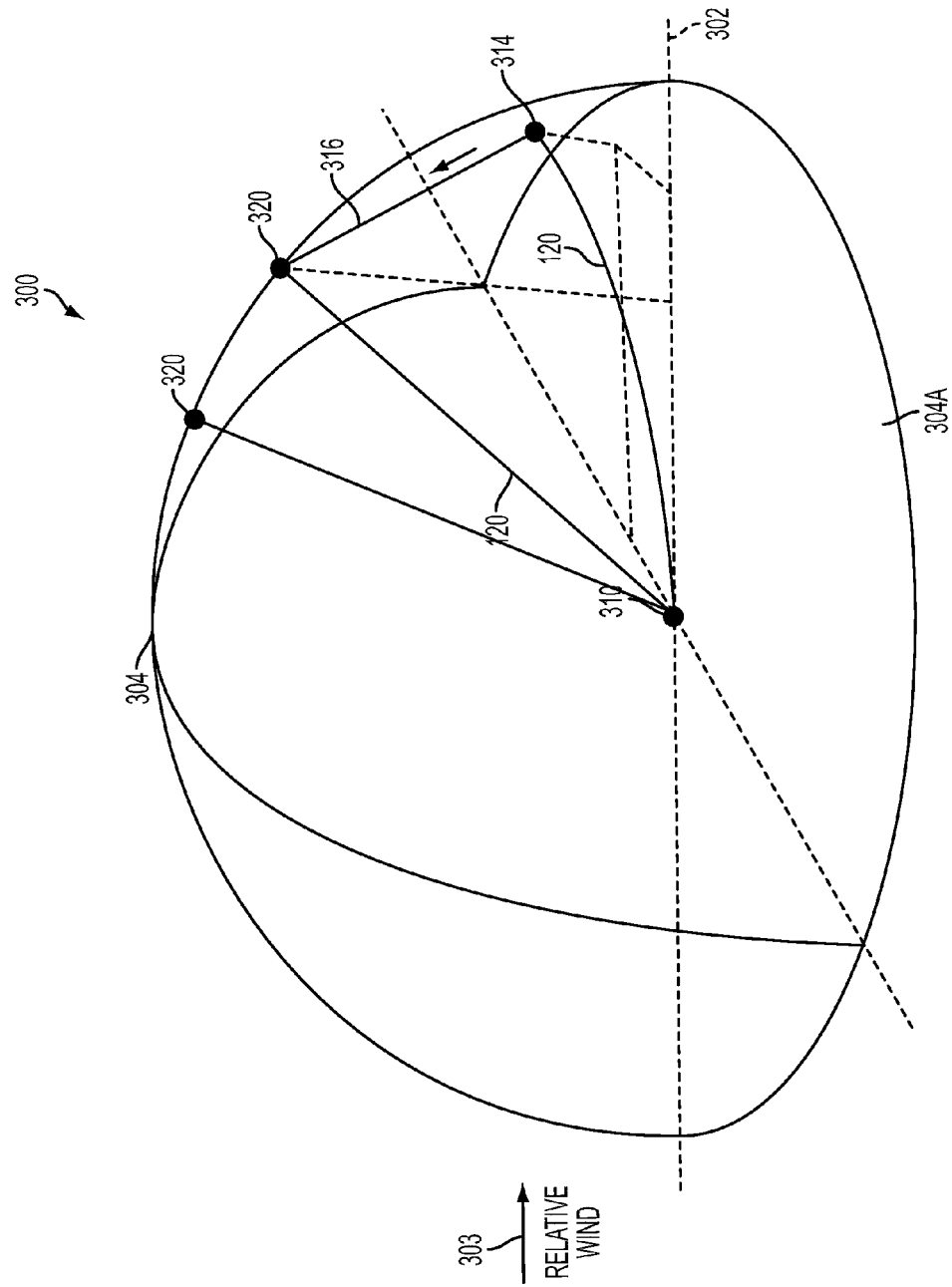
FIG. 3C depicts an example of an aerial vehicle transitioning from hover flight to crosswind flight in a tether sphere, according to an example embodiment.

FIG. 3C depicts example 300 from a three-dimensional (3D) perspective. Accordingly, like numerals may denote like entities. As noted above, tether sphere 304 has a radius based on a length of a tether 120, such as a length of the tether 120 when it is extended. Also as noted above, in FIG. 3C, the tether 120 is connected to ground station 310, and the ground station 310 is located on ground 302. Further, relative wind 303 contacts the tether sphere 304. Note, in FIG. 3C, only a portion of the tether sphere 304 that is above the ground 302 is depicted. The portion may be described as one half of the tether sphere 304.

As shown in FIG. 3C, the first portion 304A of the tether sphere 304 is substantially downwind of the ground station 310. In FIG. 3C, the first portion 304A may be described as one quarter of the tether sphere 304.

Like FIG. 3B, FIG. 3C depicts transitioning aerial vehicle 130 (not shown in FIG. 3C to simply the Figure) between hover flight and crosswind flight. As shown in FIG. 3C, when the aerial vehicle 130 transitions from the hover-flight orientation to a forward-flight orientation, the aerial vehicle may be positioned at a point 314 that is inside the first portion 304A of the tether sphere 304. Further still, as shown in FIG. 3C, when aerial vehicle 130 ascends in the forward-flight orientation to a location 320 that is substantially on the first portion 304A of the tether sphere 304, the aerial vehicle may follow a path 316. Yet even further, as shown in FIG. 3C, aerial vehicle 130 may then transition from location 320 in a forward-flight orientation to a crosswind-flight mode at location 322, for example.

III. Ilustrative Methods

Figure 4:
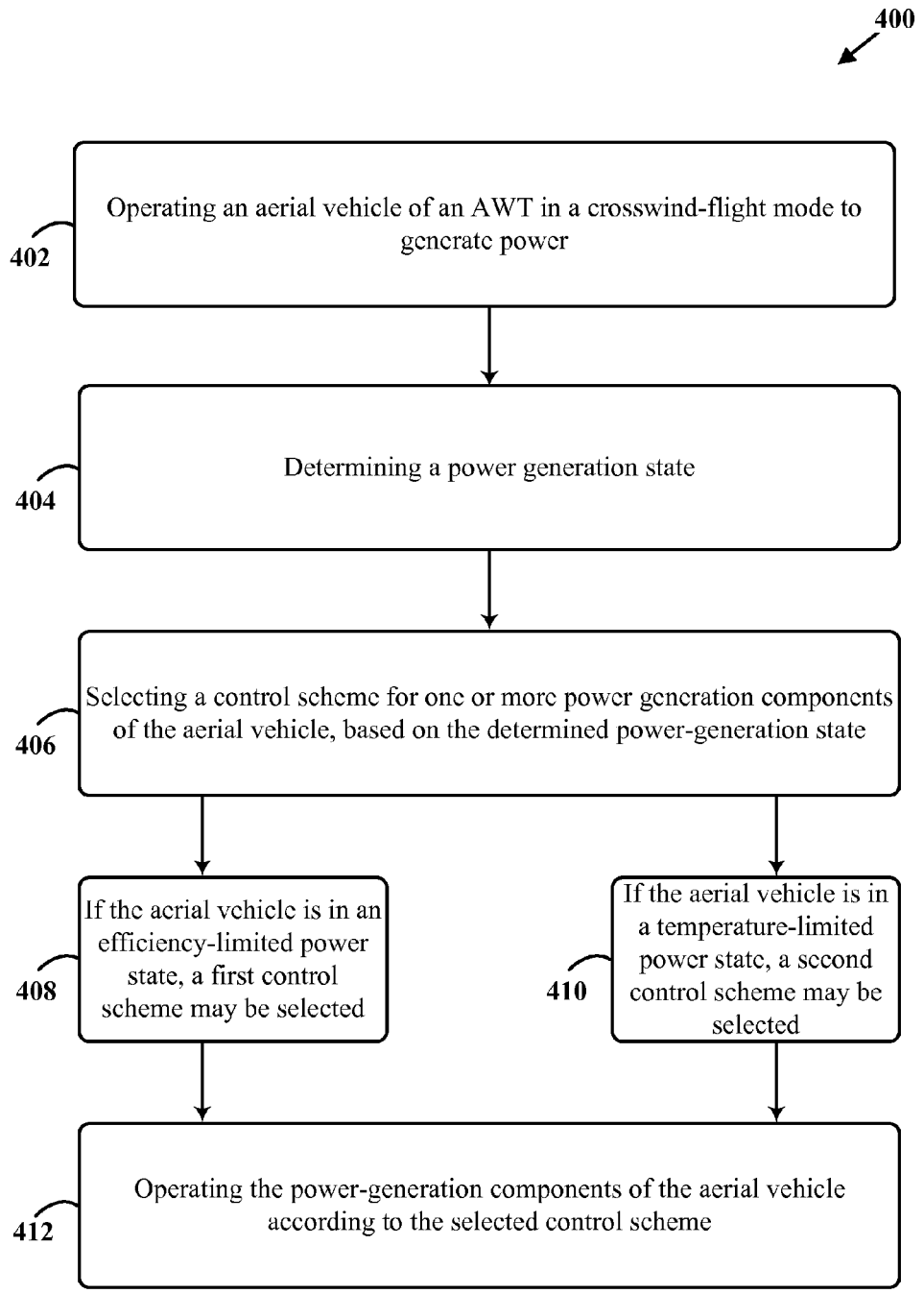
FIG. 4 is a flowchart of a method, according to an example embodiment.

FIG. 4 is a flowchart illustrating a method 400, according to an example embodiment. The method 400 may be used to control rotor operation of an aerial vehicle of an AWT. More specifically, the method 400 may be used to control one or more rotors of an aerial vehicle while the aerial vehicle is in a crosswind-flight mode in a manner that may control power generation and/or prevent or limit overheating of components of the aerial vehicle. Illustrative methods, such as method 400, may be carried out in whole or in part by a component or components of an AWT, such as by the one or more components of the AWT 100 shown in FIG. 1 and the AWT 200 shown in FIG. 2. For simplicity, method 400 may be described generally as being carried out by an aerial vehicle of an AWT, such as the aerial vehicle 130 of AWT 100 and/or the aerial vehicle 230 of AWT 200. However, it should be understood that example methods, such as method 400, may be carried out by other entities or combinations of entities without departing from the scope of the disclosure.

As shown by block 402, method 400 involves operating an aerial vehicle of an AWT in a crosswind-flight mode to generate power. The aerial vehicle may, for example, operate along a particular flight path and while operating along the flight path, the aerial vehicle may operate one or more rotors similar to or the same as rotors 134A-D to generate the power. The flight path may be constrained by a tether such as tether 120 and, as noted above, the tether may define a tether sphere having a radius based on a length of the tether. For example, the tether sphere may be the same as or similar to tether sphere 304 of FIGS. 3A-3C. The flight path may be substantially on the tether sphere and may include a substantially circular path (e.g., path 150) that allows the aerial vehicle to generate the power.

Within this disclosure, the term "substantially circular" refers to exactly circular and/or one or more deviations from exactly circular that does not significantly impact the aerial vehicle from generating power. Substantially circular paths may include, for example, oval-shaped paths, balloon-shaped paths, and bowl-shaped paths to name a few. Other substantially circular paths are possible as well.

To begin operating along the flight path, the aerial vehicle may be deployed, may engage in hover flight, may engage in forward flight, and may then transition to the first flight path on the tether sphere. For example, at block 402, the aerial vehicle may be operated in the same or a similar way as the aerial vehicle 130 may be operated when transitioning from a hover flight orientation to a crosswind flight orientation as described with reference to example 300 of FIGS. 3A-3C. Accordingly, when operating along the first flight path in the crosswind-flight mode, the aerial vehicle may be oriented the same as or similar to aerial vehicle 130 at point 322 of FIGS. 3B and 3C.

Note, in other examples, some of the above referenced flight maneuvers may be omitted. For instance, in some examples, the aerial vehicle may be deployed, engage in forward flight to a position on the tether sphere, and thereafter immediately transition to the first flight path. Thus, in such examples, the aerial vehicle may omit the hover flight maneuver.

To generate power, as noted above, while the aerial vehicle operates along the flight path, the one or more rotors may be configured to drive one or more generators for the purpose of generating electrical energy. The one or more rotors may each include one or more blades (e.g., three blades) that may rotate via interactions with the wind and which could be used to drive the one or more generators. In practice, the blades of the rotors may act as barriers to the wind and when the wind forces the blades to move, the wind may transfer some of its energy to the rotors via the rotation of the blades. As the rotor rotates, it may drive the generator and the generator may generate power. The power generated may be directly proportional to the rotational speed of the rotors. Accordingly, the faster the wind is applied to the blades of the rotors, the more electrical energy may be generated and eventually captured by the AWT.

At block 404, while the aerial vehicle is in crosswind-flight mode, method 400 includes determining a power generation state. For reference, FIG. 5 helps illustrates exemplary power generation states.

Figure 5:
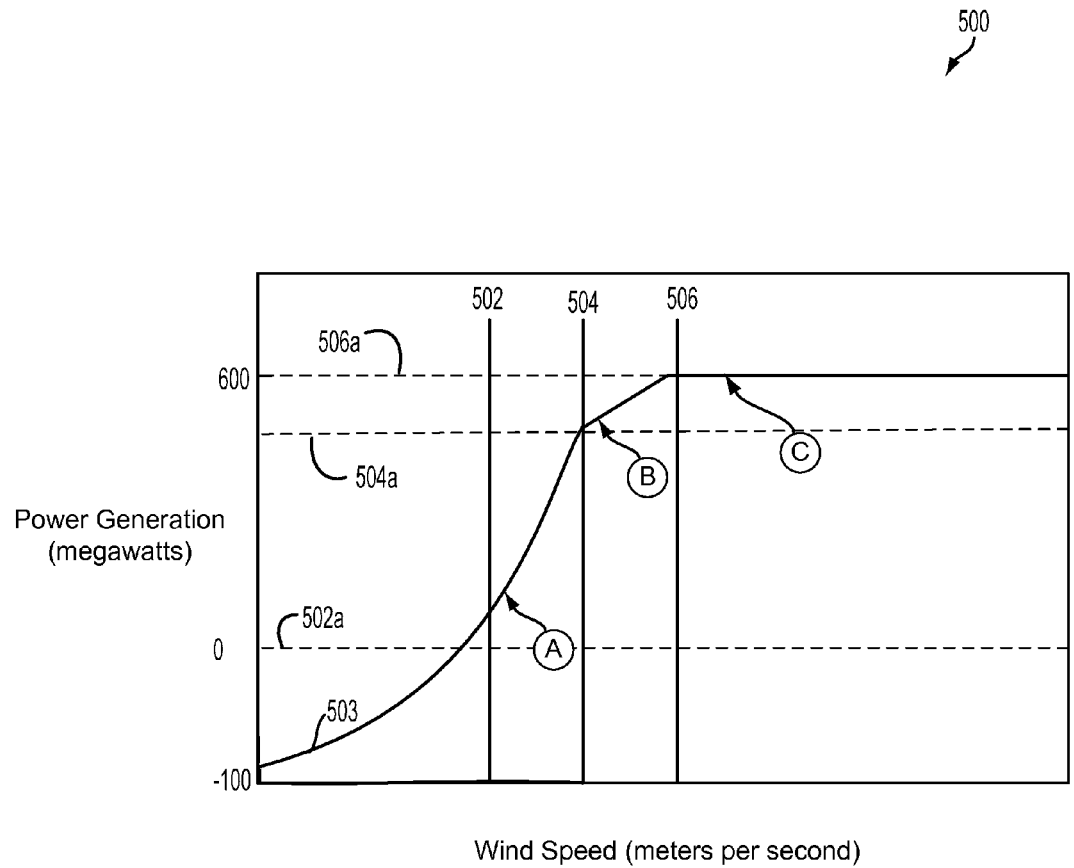
FIG. 5 illustrates a graphical representation of an operating scenario, according to an example embodiment.

FIG. 5 illustrates a graphical representation of an operating scenario, according to an example embodiment. The vertical axis represents power generation of the aerial vehicle, and the horizontal axis represents wind speed. The aerial vehicle may produce power according to a power curve 503. The power curve 503 may represent the amount of power the aerial vehicle may generate as a function of wind speed. In one embodiment, the aerial vehicle may begin generating power when wind speeds are above the minimum level indicated by line 502 (e.g., 3.5 meters-per-second). Note, within the context of this disclosure, the power generation curve 503, wind speeds, and power generation levels used in FIG. 5 are not intended to be limiting and other wind speeds and power generation levels may be possible.

FIG. 5 also illustrates some exemplary power generation states. Segment A illustrates a section of power curve 503 where the aerial vehicle is generating power (i.e., it is operating above zero threshold level 502a), but producing less than the rated power 506a, and less than the threshold level 504a, where the power generation components may begin to be limited by rising temperatures. In this segment of the power curve 503, the AWT may attempt to capture as much power as possible in the most efficient manner possible. Stated differently, while operating along segment A, the AWT may attempt to generate the maximum power available from the wind. This may be referred to as an efficiency-limited power generation state.

At wind speeds greater than those indicated by line 504, the heat produced by the power generation components may limit the ability of those components to generate power. At the threshold level indicated by 504a, the incremental increase in power generation per unit of wind speed drops due to the effect of heating in the power generation components. This is illustrated by the changing slope in the power curve 503 when it crosses the threshold level 504a. At this point, the aerial vehicle may still be operating at less than the rated power 506a. Accordingly, segment "B" illustrates a portion of power curve 503 where the aerial vehicle is generating power less than the rated power 506a, and where the power generation components of the aerial vehicle are limited by temperature concerns. This may be referred to as a temperature-limited power generation state. In this section of power curve 503, it may be desirable to operate the aerial vehicle in a manner that controls the heat production of the power generation components.

At wind speeds greater than those indicated by line 506, the aerial vehicle may be operating at its maximum rated power. Segment C illustrates a portion of power curve 503 where the aerial vehicle is producing power at the rated power threshold level 506a. This may be referred to as a power-limited power generation state. In this section of power curve 503, it may be desirable to operate the aerial vehicle in a manner that controls both the power generation heat production of the power generation components.

Referring again to FIG. 4, at block 404 the method involves determining a power generation state. One method of determining the power generation state is to determine the amount of generated power and to evaluate the generated power amount in relation to known power threshold levels, such as threshold levels 502, 504, and 506 described in relation to FIG. 5. Thus, the AWT could determine whether it is operating in, for example, an efficiency-limited power generation state, a temperature-limited power generation state, or a power-limited power generation state.

To measure the power generation amount, the AWT may use, for example, a power sensing element of sensors 232 that may continuously sense a power output of the aerial vehicle. Upon determining the power generation amount, the comparison to one or more power threshold levels may be made, for example, using a control system similar to or the same as control system 248 and one or more processors similar to or the same as processors 242 and/or processors 212. Based on the comparison, it may be determined that the AWT is producing power at a power output level that is equal to or less than the power threshold and/or a power output level that is equal to or greater than the power threshold.

Another method of determining the power generation state is to determine the wind speed in which the aerial vehicle is operating and, by comparing wind speed to a known power generation curve for the AWT, the amount of power generation. The power generation amount could then be compared to threshold levels as previously described.

To measure the wind speed, the aerial vehicle may use, for example, one or more pitot tubes corresponding to sensors 232, along with processors 242, and control system 248. For instance, the aerial vehicle may use control system 248 to cause a pitot tube to be positioned directly into the wind. In some examples, the aerial vehicle may use the pitot tube to obtain a large number of successive measurements of the wind or periodic measurements of the wind when measuring the wind speed. Successive measurements may be multiple measurements made using the pitot tube occurring over time and may be continuous or may occur in intervals. In other examples, multiple pitot tubes may be used to measure wind speed. In other examples, wind speed may be measured using an anemometer or ultrasonic wind sensor located on the ground station.

At block 406, method 400 includes selecting a control scheme for one or more power generation components of the aerial vehicle, based on the determined power-generation state. In one embodiment, two control schemes are described; however, additional control schemes are possible and this example should not be construed as limiting the quantity of control schemes.

As illustrated by block 408, if the aerial vehicle is in an efficiency-limited power state, a first control scheme may be selected. As illustrated by block 410, if the aerial vehicle is in a temperature-limited power state, a second control scheme may be selected. Preferably, these control schemes are different control schemes. Alternatively, these control schemes may be the same control schemes, but with different operational parameters.

One control scheme may comprise controlling at least one rotor via setting an advance ratio for the rotor. Under an advance ratio control scheme, rotors may operate according to an advance ratio that may describe how the blades of the rotor advance or screw into the wind (i.e., air). For example, the advance ratio at which a rotor is operating may be the ratio between the distance the rotor moves forward through the air during one revolution, and the diameter of the rotor. Mathematically, the advance ratio may be represented as $J=V_a/n*D$. J is the non-dimensional term representing the advance ratio. $V_a$ is the distance of advance per unit time, which may be referred to as the apparent or local wind speed seen by the rotor, or as the airspeed of air into the rotor. This is generally a significantly different value than the natural wind speed in which the AWT is operating; for example, 70 meters-per-second is a reasonable airspeed for the rotors to see during crosswind flight mode, as opposed to the 3.5 to 10 meters-per-second wind speed that the aerial vehicle may be operating within during that time. n represents the rotational speed of the rotor in revolutions per unit time. D represents the diameter of the rotor blades. Alternatively, the advance ratio may be mathematically defined as $J=\pi V/wR$ where $\pi$ is the mathematical constant pi, V is equivalent to $V_a$ in the previous example, w represents the angular rate of the rotor (in rad/s), and R represents the radius of the rotor blades.

Advance ratio may be thought of as the effective angle-of-attack of the rotor, or alternatively as the pitch angle of the helical path the tips of the rotor traverse as they move through the air. Advantageously, advance ratio control automatically takes into account how fast the aerial vehicle is traveling. It is useful for preventing rotor blade stall and also for controlling rotors to their maximum drag state (preferably with some margin away from a stall). In some embodiments, aerial vehicles may be designed such the rotor blades are as small as they can be while meeting optimal efficiency metrics. For example, for some aerial vehicles, optimal efficiency is obtained when the drag coefficient of the rotors is one-half of the drag coefficient of the rest of the aerial vehicle system (i.e., $C_{D(prop)}=\frac{1}{2}C_{D(sys)}$), so operating in the maximum drag state may be preferred when the aerial vehicle is operating in the efficiency-limited power generation state.

In an alternative embodiment, two or more rotors may be controlled by setting an independent advance ratio for each rotor. For example, in order to produce lift, the airspeed over the top of the wing of the aerial vehicle (and thus at the top rotors) may be higher than that at the bottom of the wing (and thus at the bottom rotors). Also, if the wing is flying in a circle or similar pattern, the outboard rotors travel faster than the inboard rotors. Thus, the top rotors and outboard rotors have the potential to generate much higher powers and heat than the bottom rotors and inboard rotors. Under this condition, the advance ratio control may be used in the temperature-limited section of the power curve. The top and outer rotors may be set to a lower advance ratio (i.e., lower drag coefficient) and the lower and inner rotors may be set to a higher advance ratio (i.e., higher drag coefficient). This may have the effect of more evenly distributing the power generation among the generators.

Another control scheme may be thrust/drag control. Under this scheme, each rotor is commanded to produce a specified thrust or drag. To do this, airspeed at the rotor is determined (or estimated). An angular rate of the rotor blades is then calculated that will produce the required thrust or drag. Thrust/drag control is useful for applying specific turning moments to the aircraft (e.g., for hovering or turning). It is also useful for attempting to produce the optimal amount of power (e.g., at $C_{D(prop)} = \frac{1}{2} C_{D(sys)}$) during the efficiency limited power generation state. Thrust/drag control may also be useful for dealing with thermal limits in the temperature-limited power generation state, or for other limiting states, such as when tension on the tether may limit operation of the aerial vehicle. For example, increasing $C_{D(prop)}$ may decrease tension in the tether, while decreasing $C_{D(prop)}$ may increase cooling of the generator.

Another control scheme may be torque control. Torque in a generator (or in a motor, when the generator may be acting as a motor to drive the rotor, as opposed to being driven by the rotor) is nearly directly measurable as it is proportional to the current that passes through the generator's coils. As heating of this power generation components is largely determined by Joule heating in the coils ($P_{heat} = I^2 R$), current and/or torque limiting is a useful parameter to control undesirable heating. In the efficiency-limited section of the power curve, putting a maximum torque limit on the generators is useful for preventing temporary or unexpected overheating. For example, this may occur when the generators are used as motors to help turn the aerial vehicle. In the temperature- or power-limited states, the generators can be configured to receive (and/or the motors can be configured to produce) a maximum amount of torque which corresponds to the maximum heating allowed in the generator/motor. This torque set-point may be scaled with wind speed (or mean wing speed of the aerial vehicle) to follow the predicted cooling behavior generator (or generator as motor).

Finally, referring now to block 412, method 400 includes operating the power-generation components of the aerial vehicle according to the selected control scheme.

Summarily, method 400 may allow the aerial vehicle to improve power generation in variable wind conditions. Selection of various control schemes disclosed herein may allow for efficient operation of an aerial vehicle, while preventing or limiting overheating or over-power conditions.

Figure 6:
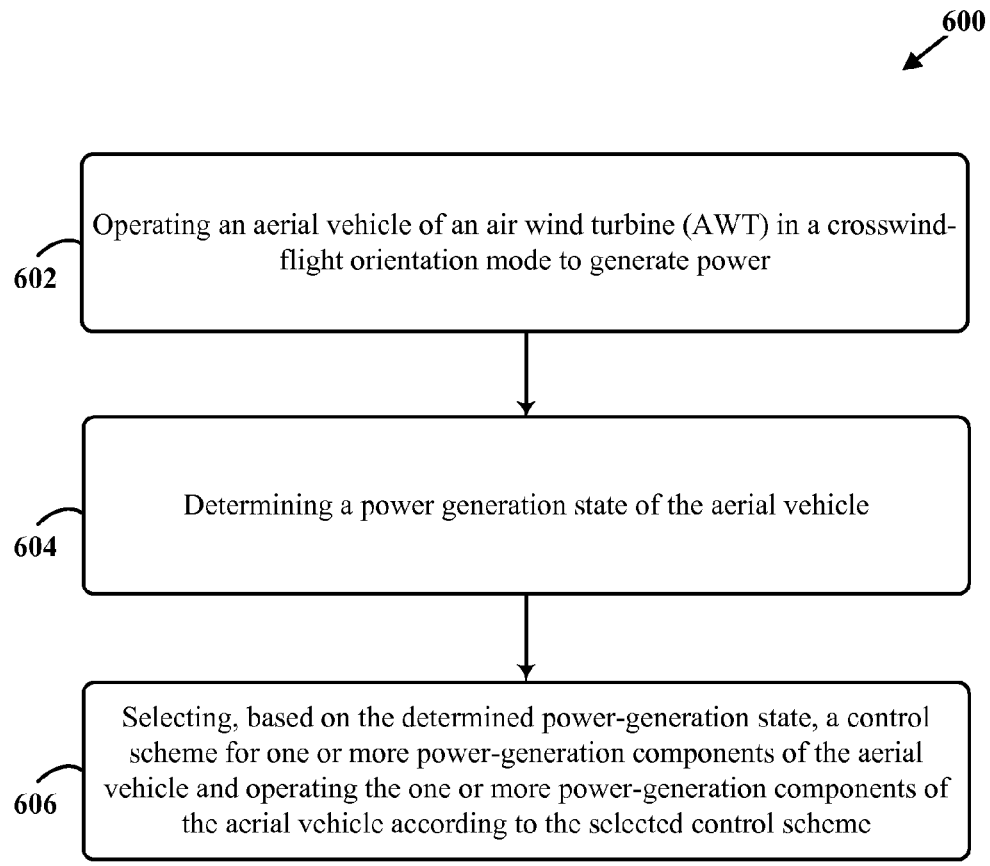
FIG. 6 is a flowchart of a method, according to an example embodiment.

FIG. 6 illustrates another embodiment of a method 600. At block 602, method may comprise operating an aerial vehicle of an air wind turbine (AWT) in a crosswind-flight mode to generate power. The aerial vehicle may be coupled to a ground station through a tether. The aerial vehicle may include at least one rotor coupled to at least one generator for the purpose of power generation when the aerial vehicle operates in the crosswind-flight mode. While the aerial vehicle is in the crosswind-flight mode, the method may continue at block 604 with determining a power generation state of the aerial vehicle. The power generation state may be one of a plurality of power generation states of the aerial vehicle. At block 606, the method 600 may further include selecting, based on the determined power-generation state, a control scheme for one or more power-generation components of the aerial vehicle and operating the one or more power-generation components of the aerial vehicle according to the selected control scheme.

In another embodiment, an airborne wind turbine (AWT) system may comprise an aerial vehicle configured to operate in a crosswind-flight mode to generate power. The aerial vehicle may be coupled to a ground station through a tether. The aerial vehicle may include at least one rotor coupled to at least one generator for the purpose of power generation when the aerial vehicle operates in the crosswind-flight mode. The system may further include a control system, such as control system 248. The control system may be configured to, while the aerial vehicle is in the crosswind-flight mode, determine a power generation state of the aerial vehicle. The power generation state may be one of a plurality of power generation states of the aerial vehicle. The plurality of power generation states may include, but are not limited to, an efficiency-limited power generation state and a temperature-limited power generation state. Other power generation states are possible as well. The control system may be further configured to include selecting, based on the determined power-generation state, a control scheme for one or more power-generation components of the aerial vehicle. A first control scheme may be selected if the aerial vehicle is in the efficiency-limited power generation state. A second control scheme may be selected if the aerial vehicle is in the temperature-limited power generation state. Additional or other control schemes may be selected as well, and may be based on power generation states other than an efficiency-limited power generation state and a temperature-limited power generation state. The control system may also be further configured to operate the one or more power-generation components of the aerial vehicle according to the selected control scheme.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures. Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising:
    operating an aerial vehicle of an air wind turbine (AWT) in a crosswind-flight mode to generate power, wherein the aerial vehicle is coupled to a ground station through a tether, wherein the aerial vehicle includes at least one rotor coupled to at least one generator for power generation when the aerial vehicle operates in the crosswind-flight mode; and while the aerial vehicle is in the crosswind-flight mode:
determining, based on sensor data, an amount of power generated by the aerial vehicle;
comparing the amount of power generated by the aerial vehicle to both a first threshold power and a second threshold power;
if the comparison indicates that the amount of power generated by the aerial vehicle is less than both the first threshold power and the second threshold power, then determining that the aerial vehicle is in a first power generation state, and operating one or more power-generation components of the aerial vehicle according to a first control scheme, wherein the first control scheme includes setting a first drag coefficient of the at least one rotor;
if the comparison indicates that the amount of power generated by the aerial vehicle is greater than or equal to the first threshold power and less than or equal to the second threshold power, then determining that the aerial vehicle is in a second power generation state, and operating the one or more power-generation components of the aerial vehicle according to a second control scheme, wherein the second control scheme includes decreasing the setting of the first drag coefficient of the at least one rotor to a second drag coefficient to control heat generation of the at least one rotor; and
if the comparison indicates that the amount of power generated by the aerial vehicle is greater than both the first threshold power and the second threshold power, then determining that the aerial vehicle is in a third power generation state, and operating the one or more power-generation components of the aerial vehicle according to a third control scheme, wherein the third control scheme includes setting a torque limit for the at least one rotor such that the at least one generator of the aerial vehicle operates at a rated power threshold.

2. The method of claim 1, wherein each of the first control scheme, the second control scheme, and the third control scheme is selected from a plurality of control schemes comprising at least the first control scheme, the second control scheme, and the third control scheme.

3. The method of claim 1, wherein the first control scheme maximizes power generation, wherein the second control scheme controls heat generation associated with power generation, and wherein the third control scheme controls both power generation and heat generation associated with power generation.

4. The method of claim 1, wherein the first control scheme is selected, and wherein operating the one or more power-generation components of the aerial vehicle according to the first control scheme comprises controlling the at least one rotor via setting an advance ratio for the at least one rotor, wherein the AWT is operating below a rated power of the AWT, and wherein setting the advance ratio for the at least one rotor comprises setting a fixed advance ratio for the at least one rotor that does not equal or exceed an advance ratio resulting in rotor stall.

5. The method of claim 1, wherein the second control scheme is selected, and wherein the at least one rotor coupled to the at least one generator comprises a first rotor coupled to a first generator and a second rotor coupled to a second generator, and wherein the first rotor is subject to a first airspeed and the second rotor is subject to a second airspeed that is greater than the first airspeed, and wherein operating the one or more power-generation components of the aerial vehicle according to the second control scheme comprises:
operating the first rotor at a first advance ratio; and
operating the second rotor at a second advance ratio that is less than the first advance ratio such that power generated by the second generator is substantially equivalent to power generated by the first generator.

6. The method of claim 1, wherein the third control scheme is selected, and wherein operating the one or more power-generation components of the aerial vehicle according to the third control scheme further comprises:
determining a maximum current that may safely pass through the at least one generator;
for the at least one rotor coupled to the at least one generator, determining a maximum rotor torque that corresponds to the maximum current; and
setting the torque limit of the at least one rotor to the maximum rotor torque.

7. The method of claim 6, wherein the at least one generator operates as a motor supplying torque to the at least one rotor.

8. The method of claim 1, wherein the first threshold power corresponds to a point on a power-generation curve where an incremental increase in power generation per unit of wind speed drops due to an effect of heating in the power-generation components.

9. An airborne wind turbine (AWT) system comprising:
an aerial vehicle configured to operate in a crosswind-flight mode to generate power, wherein the aerial vehicle is coupled to a ground station through a tether, and wherein the aerial vehicle includes at least one rotor coupled to at least one generator for power generation when the aerial vehicle operates in the crosswind-flight mode; and
a control system configured to:
(i) while the aerial vehicle is in the crosswind-flight mode, receive sensor data to determine an amount of power generated by the aerial vehicle;
(ii) compare the amount of power generated by the aerial vehicle to both a first threshold power and a second threshold power;
(iii) if the comparison indicates that the amount of power generated by the aerial vehicle is less than both the first threshold power and the second threshold power, then determine that the aerial vehicle is in a first power generation state, and operate one or more power-generation components of the aerial vehicle according to a first control scheme, wherein the first control scheme includes setting a first drag coefficient of the at least one rotor;
(iv) if the comparison indicates that the amount of power generated by the aerial vehicle is greater than or equal to the first threshold power and less than or equal to the second threshold power, then determine that the aerial vehicle is in a second power generation state, and operate the one or more power-generation components of the aerial vehicle according to a second control scheme, wherein the second control scheme includes decreasing the setting of the first drag coefficient of the at least one rotor to a second drag coefficient to control heat generation of the at least one rotor; and
(v) if the comparison indicates that the amount of power generated by the aerial vehicle is greater than both the first threshold power and the second threshold power, then determine that the aerial vehicle is in a third power generation state, and operate the one or more power-generation components of the aerial vehicle according to a third control scheme, wherein the third control scheme includes setting a torque limit for the at least one rotor such that the at least one generator of the aerial vehicle operates at a rated power threshold.

10. The system of claim 9, wherein the first control scheme maximizes power generation, wherein the second control scheme controls heat generation associated with power generation, and wherein the third control scheme controls both power generation and heat generation associated with power generation.

11. The system of claim 9, wherein the first control scheme is selected, and wherein operating the one or more power-generation components of the aerial vehicle according to the first control scheme comprises controlling the at least one rotor via setting an advance ratio for the at least one rotor, and wherein setting the advance ratio for the at least one rotor comprises setting a fixed advance ratio for the at least one rotor that does not equal or exceed an advance ratio resulting in rotor stall.

12. The system of claim 9, wherein the second control scheme is selected, and wherein the at least one rotor coupled to the at least one generator comprises a first rotor coupled to a first generator and a second rotor coupled to a second generator, and wherein the first rotor is subject to a first airspeed and the second rotor is subject to a second airspeed that is greater than the first airspeed, and wherein, to operate the one or more power-generation components of the aerial vehicle according to the second control scheme, the control system is further configured to:
operate the first rotor at a first advance ratio; and
operate the second rotor at a second advance ratio that is less than the first advance ratio such that power generated by the second generator is substantially equivalent to power generated by the first generator.

13. The system of claim 9, wherein the third control scheme is selected, and wherein, to operate the one or more power-generation components of the aerial vehicle according to the third control scheme, the control system is further configured to:
determine a maximum current that may safely pass through the at least one generator;
for the at least one rotor coupled to the at least one generator, determine a maximum rotor torque that corresponds to the maximum current; and
set the torque limit of the at least one rotor to the maximum rotor torque.

14. The system of claim 13, wherein the at least one generator operates as a motor supplying torque to the at least one rotor.

15. The system of claim 9, wherein the first threshold power corresponds to a point on a power-generation curve where an incremental increase in power generation per unit of wind speed drops due to an effect of heating in the power-generation components.

* * * * *